US010921930B2

(12) United States Patent
Ano et al.

(10) Patent No.: US 10,921,930 B2
(45) Date of Patent: Feb. 16, 2021

(54) DISPLAY APPARATUS, DISPLAY SYSTEM, AND METHOD FOR CONTROLLING DISPLAY APPARATUS

(71) Applicant: SEIKO EPSON CORPORATION, Tokyo (JP)

(72) Inventors: Takahiro Ano, Matsumoto (JP); Yuhei Akatsuka, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/592,830

(22) Filed: Oct. 4, 2019

(65) Prior Publication Data

US 2020/0110526 A1 Apr. 9, 2020

(30) Foreign Application Priority Data

Oct. 5, 2018 (JP) .................................. 2018-189817

(51) Int. Cl.
*G06F 3/041* (2006.01)
*G06F 3/0354* (2013.01)

(52) U.S. Cl.
CPC ...... *G06F 3/04164* (2019.05); *G06F 3/03542* (2013.01)

(58) Field of Classification Search
CPC combination set(s) only.
See application file for complete search history.

(56) References Cited

U.S. PATENT DOCUMENTS

| 2003/0025683 | A1  | 2/2003 | Adler   |              |
|--------------|-----|--------|---------|--------------|
| 2006/0037029 | A1* | 2/2006 | Yamada  | G06F 9/4411  |
|              |     |        |         | 719/327      |
| 2010/0082845 | A1* | 4/2010 | Kim     | H04N 1/0044  |
|              |     |        |         | 710/14       |
| 2013/0093672 | A1* | 4/2013 | Ichieda | G06F 3/0418  |
|              |     |        |         | 345/157      |

(Continued)

FOREIGN PATENT DOCUMENTS

JP 2004-537759 A 12/2004
JP 2007-256611 A 10/2007

(Continued)

*Primary Examiner* — Christopher E Leiby
(74) *Attorney, Agent, or Firm* — Oliff PLC

(57) ABSTRACT

Display apparatus including plurality of input sections, communication section, connection detector that detects connection between information terminal apparatus and communication section via cable, position information generator that generates position information on position on a display surface at which pointing element points, display section that displays an image on display surface, controller that executes first mode that causes display section to display image based on image information and position information and second mode that causes display section to display image based on image information and operates information terminal apparatus based on position information wherein two modes are switchable from one to the other, and storage that stores source information on use result representing input section used in execution of second mode, and when connection detector detects connection, controller selects one of the plurality of input sections based on source information and executes second mode.

10 Claims, 4 Drawing Sheets

(56) References Cited

U.S. PATENT DOCUMENTS

2013/0135263 A1    5/2013  Omura
2018/0356934 A1*  12/2018  Imanishi ................ G09G 5/003

FOREIGN PATENT DOCUMENTS

| JP | 2012-029294 A | 2/2012 |
| JP | 2013-088840 A | 5/2013 |
| JP | 2013-152739 A | 8/2013 |

* cited by examiner

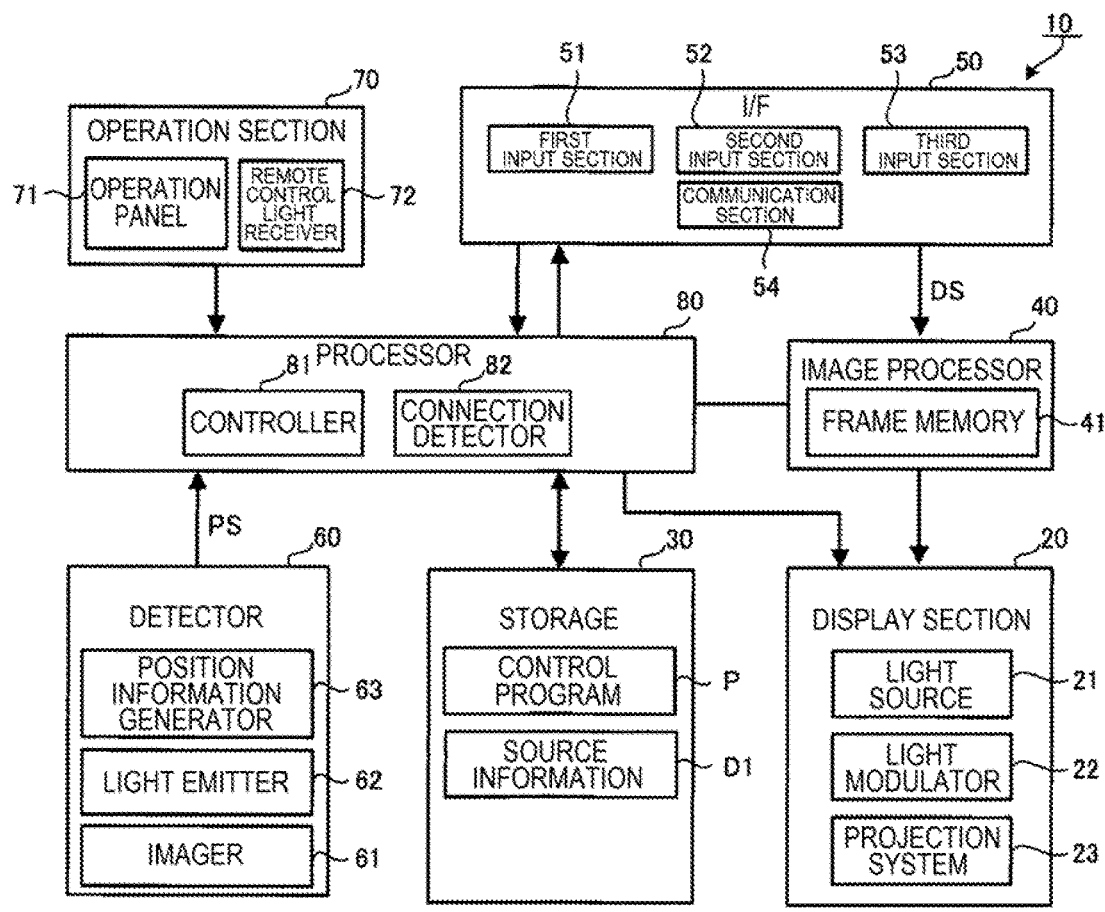
FIG. 2
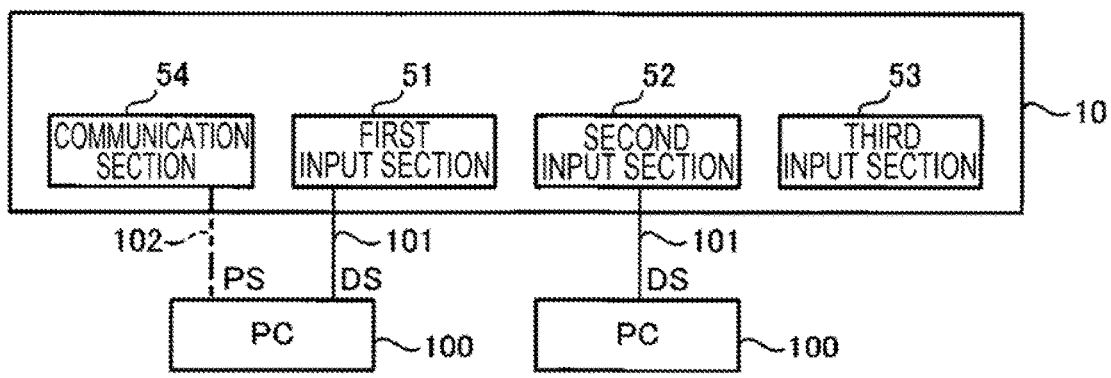
FIG. 3
FIG. 4

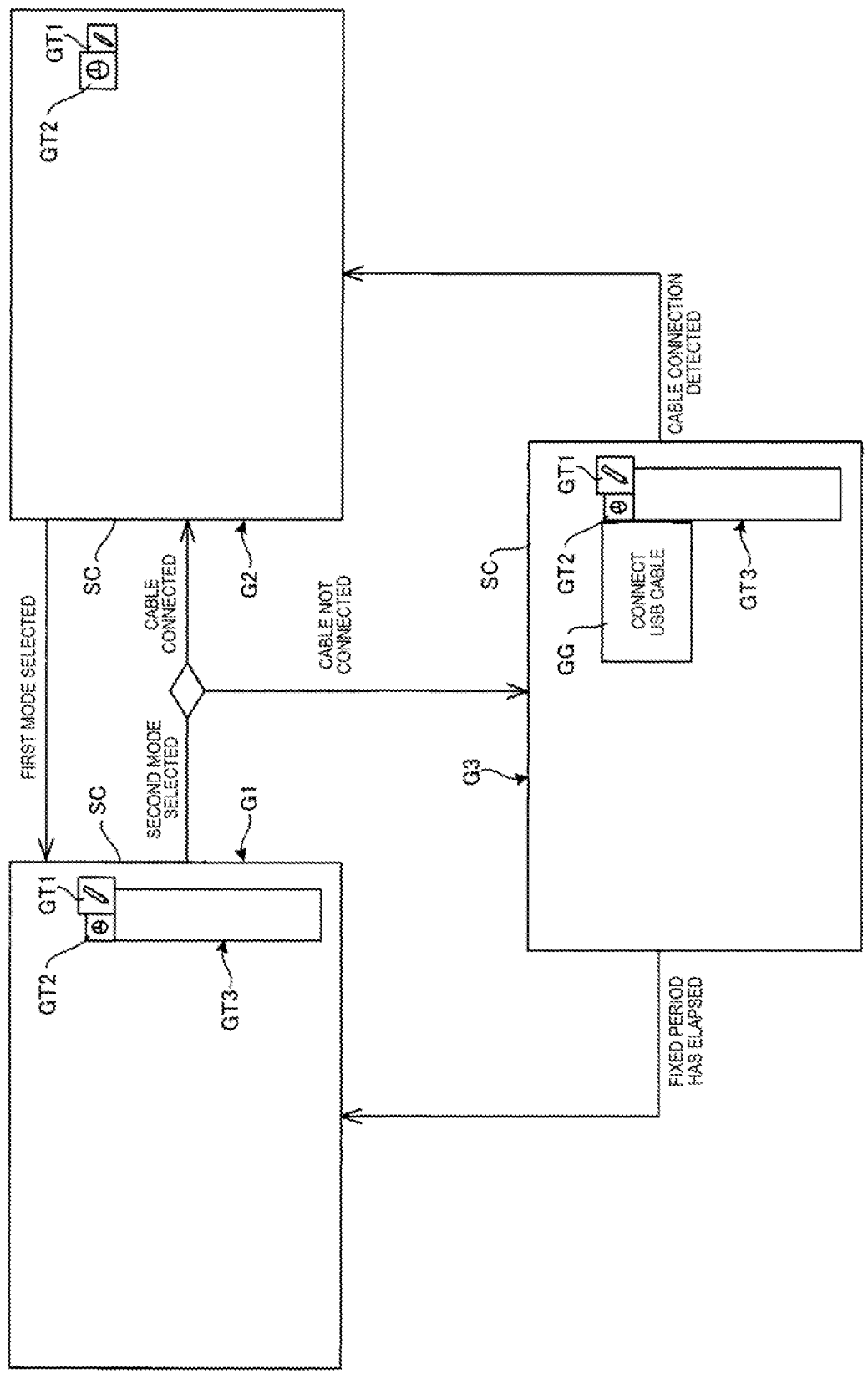

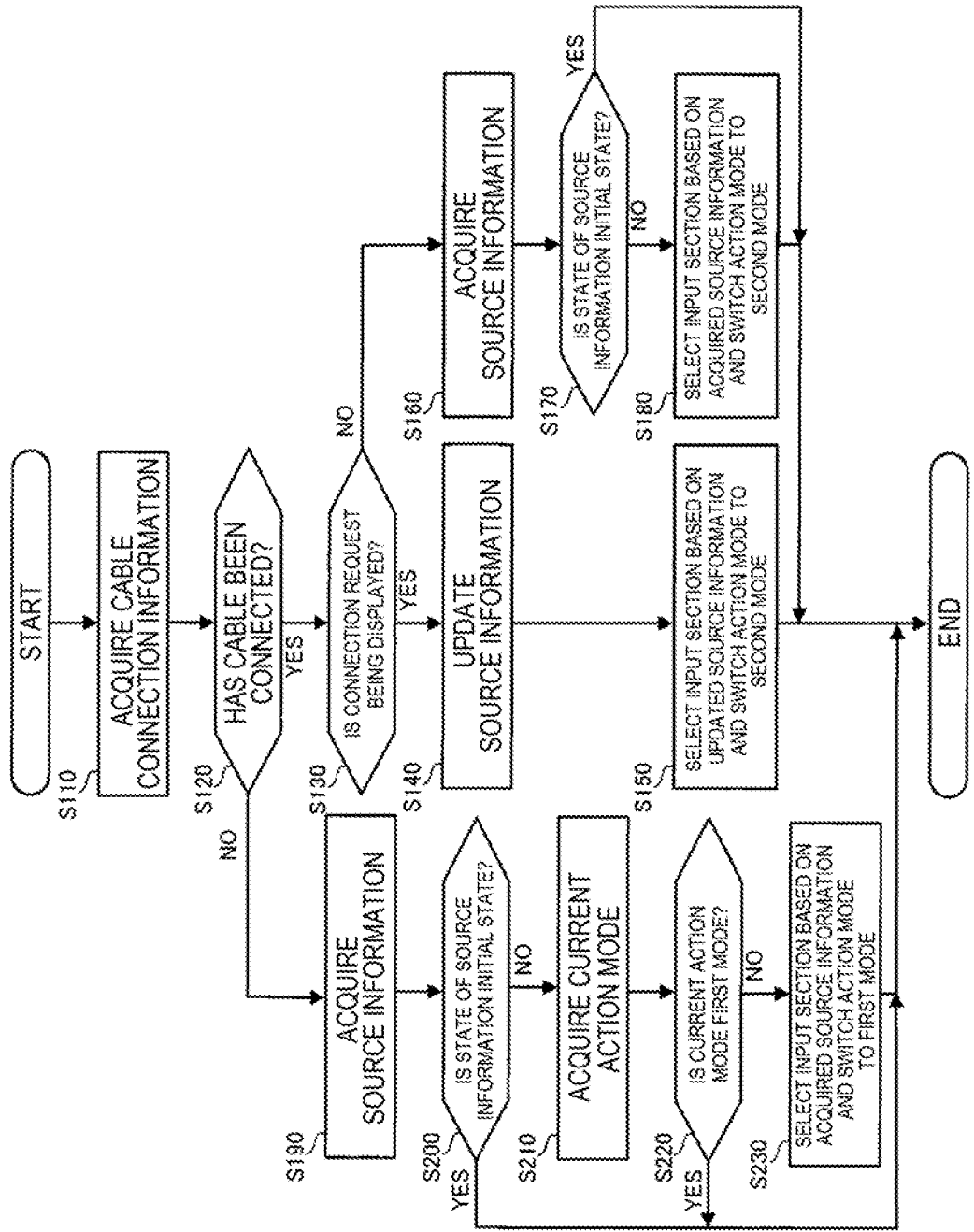

DISPLAY APPARATUS, DISPLAY SYSTEM, AND METHOD FOR CONTROLLING DISPLAY APPARATUS

The present application is based on, and claims priority from JP Application Serial Number 2018-189817, filed Oct. 5, 2018, the disclosure of which is hereby incorporated by reference herein in its entirety.

BACKGROUND

1. Technical Field

The present disclosure relates to a display apparatus, a display system, a method for controlling the display apparatus, and a method for controlling the display apparatus.

2. Related Art

In recent years, there is a known display apparatus, such as a projector, having what is called an interactive function. An apparatus of this type is connected, for example, to a PC (personal computer) when used and accepts operation performed with a pointing element, such as a pen tool or a user's finger while displaying an image based on image information from the PC on a screen. The display apparatus described in JP-A-2013-88840 has a mode in which an image drawn in the form of the trajectory of the on-screen position at which the pointing element points is superimposed on the image described above and a mode in which the PC is operated in accordance with the on-screen position at which the pointing element points. In JP-A-2013-88840, the modes are switched from one to the other, for example, via a GUI (graphical user interface) so displayed as to be superimposed on the image described above. Further, the display apparatus described in JP-A-2013-88840 includes a plurality of interfaces to which the PC is connectable, and an interface used in the PC operation mode is set in advance.

However, the display apparatus described in JP-A-2013-88840, in which the two modes described above are manually switched from one to the other, has a problem of a low user's convenience. Further, in the display apparatus described in JP-A-2013-88840, it is necessary to set in advance the interface used in the PC operation mode out of the plurality of interfaces. The user's convenience is low also in this regard.

SUMMARY

A display apparatus according to an aspect of the present disclosure includes a display section that displays an image on a display surface, a plurality of input sections to which image information is inputtable from an information terminal apparatus, a communication section so configured that the information terminal apparatus is connectable thereto via a cable and capable of communicating with the information terminal apparatus, a connection detector that detects connection between the information terminal apparatus and the communication section via the cable, a position information generator that generates position information on a position on the display surface at which a pointing element points, a controller that executes a first mode that causes the display section to display an image based on the image information and the position information and a second mode that causes the display section to display an image based on the image information and operates the information terminal apparatus based on the position information in such a way that the two modes are switchable from one to the other, and a storage that stores source information on a use result representing the input section used in the execution of the second mode, and when the connection detector detects the connection, the controller selects one of the plurality of input sections based on the source information and executes the second mode.

A display system according to another aspect of the present disclosure includes the display apparatus according to the aspect described above and a pointing element used to point at a position on the display surface.

A method for controlling a display apparatus according to another aspect of the present disclosure is a method for controlling a display apparatus including a display section that displays an image on a display surface, a plurality of input sections to which image information is inputtable from an information terminal apparatus, a communication section so configured that the information terminal apparatus is connectable thereto via a cable and capable of communicating with the information terminal apparatus, and a position information generator that generates position information on a position on the display surface at which a pointing element points, the method including detecting connection between the information terminal apparatus and the communication section, executing a first mode that causes the display section to display an image based on the image information and the position information and a second mode that causes the display section to display an image based on the image information and operates the information terminal apparatus based on the position information in such a way that the two modes are switchable from one to the other, storing source information on a use result representing the input section used in the execution of the second mode, and selecting one of the plurality of input sections based on the source information and executing the second mode when the connection between the information terminal apparatus and the communication section is detected.

BRIEF DESCRIPTION OF THE DRAWINGS

FIG. 2 is a block diagram showing the configuration of a display apparatus according to the embodiment.

FIG. 3 shows an example of the connection between the display apparatus and an information terminal apparatus.

FIG. 4 shows an example of source information.

FIG. 5 shows image transition in the switching of a first mode and a second mode from one to the other.

FIG. 6 is a flowchart showing the procedure of the mode switching performed by the display apparatus.

DESCRIPTION OF EXEMPLARY EMBODIMENTS

Figure 1:
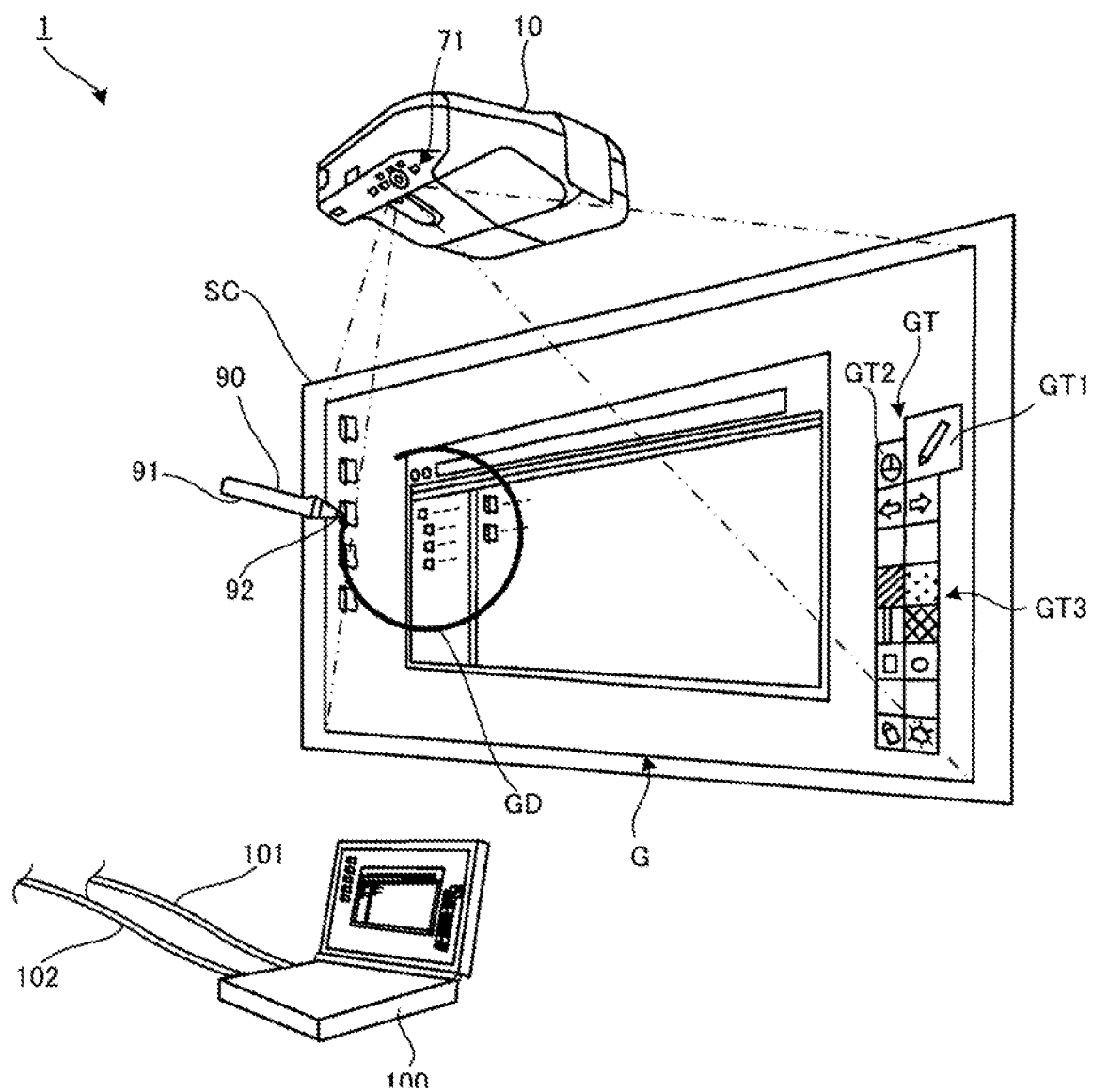
FIG. 1 is a perspective view showing a display system according to an embodiment.

A preferable embodiment according to the present disclosure will be described below with reference to the accompanying drawings. In the drawings, the dimension and scale of each portion differs from actual values as appropriate, and some portions are diagrammatically shown for ease of understanding. The scope of the present disclosure is not limited to the embodiment unless the following description particularly states that restrictions are imposed on the present disclosure.

1. Overview of Display System

FIG. 1 is a perspective view showing a display system 1 according to an embodiment. The display system 1 is what is called a projection system having what is called an interactive function. The display system 1 includes a display apparatus 10, a pointing element 90, and a PC 100, which is an example of the information terminal apparatus, as shown in FIG. 1.

In the example shown in FIG. 1, the location where a screen SC is installed is, for example, a wall. The installation location is not limited to a wall and may, for example, be a floor or a table. The location where the display apparatus 10 is installed is, for example, a ceiling, and the installation location is not limited to a ceiling, only needs to allow the display apparatus 10 to project a projection image G on the screen SC, and may, for example, be a wall, a floor, a table, or a dedicated installation bench in front of the screen SC.

The display apparatus 10 can display an image G based on image information from the PC 100 on the screen SC. Further, the display apparatus 10 can detect the position on the screen SC at which the pointing element 90 points. The display apparatus 10 has a drawing mode that is the first mode and an operation mode that is the second mode and can switch the modes from one to the other to execute the selected mode. In the drawing mode, the display apparatus 10 displays an image GD, which is an image drawn based on the trajectory of the position on the screen SC at which the pointing element 90 points, on the screen SC with the image GD superimposed on the image G described above. On the other hand, in the operation mode, the display apparatus 10 displays the image G described above on the screen SC and operates the PC 100 in this state in accordance with the position on the screen SC at which the pointing element 90 points, as a mouse or any other pointing device operates the PC 100.

Image information is inputted to the display apparatus 10 from the PC 100 via a cable 101. The display apparatus 10 can communicate with the PC 100 via a cable 102. The display apparatus 10 executes the operation mode when the PC 100 is connected to the display apparatus 10 via the cable 102.

In each of the drawing and operation modes, the display apparatus 10 displays a tool bar GT, which is an image for a GUI (graphical user interface) for allowing the display apparatus 10 to perform a variety of functions in accordance with an instruction from the pointing element 90, on the screen SC. The tool bar GT includes a drawing mode switching button GT1 and an operation mode switching button GT2 used to switch the two modes from one to the other. FIG. 1 shows the state of the tool bar GT in the drawing mode, and the tool bar GT in the drawing mode further includes a drawing tool GT3 used for drawing.

The display apparatus 10 may display an image other than the images G and GD and the tool bar GT described above, for example, an image based on image information stored in the display apparatus 10 or an image based on image information generated by the display apparatus 10, on the screen SC. The display apparatus 10 can also be operated by using an operation panel 71, which is disposed on a main body of the display apparatus 10, and a remote control that is not shown in FIG. 1.

The pointing element 90 is a pen-shaped device. The pointing element 90 includes a shaft 91 and a tip button 92, which is disposed at the tip of the shaft 91. The tip button 92 is a switch that is turned on when pressed against the screen SC. An infrared light emitter that is not shown is provided in the pointing element 90 and driven when the tip button 92 is turned on. The infrared light emitter includes, for example, an infrared LED (light emitting diode) or any other light emitting device, a light emission control circuit, and a power source. The infrared light emitter periodically emits infrared light based, for example, on a scheme compliant with the IrDA (Infrared Data Association) standard. The emitted light is detected by the display apparatus 10. The display apparatus 10 detects the position on the screen SC at which the pointing element 90 points based on the position where the pointing element 90 emits light. The shape of the pointing element 90 is not limited to a pen-like shape.

2. Configuration of Display Apparatus

FIG. 2 is a block diagram showing the configuration of the display apparatus 10 according to the embodiment. The display apparatus 10 includes a display section 20, a storage 30, an image processor 40, an interface (I/F) 50, a detector 60, an operation section 70, and a processor 80, as shown in FIG. 2.

The display section 20 displays the image G on the screen SC, which is the display surface. The display section 20 includes a light source 21, a light modulator 22, and a projection system 23.

The light source 21 is formed, for example, of a halogen lamp, a xenon lamp, an ultrahigh-pressure mercury lamp, an LED (light emitting diode), or a laser light source. The light modulator 22 modulates light outputted by the light source 21 to generate image light. The light modulator 22 is formed, for example, of a light modulation device, such as a transmissive liquid crystal panel, a reflective liquid crystal panel, or a digital mirror device (DMD). The projection system 23 focuses the image light from the light modulator 22 into an image on the screen SC. The projection system 23 is an optical system including at least one projection lens and may include a zoom lens, a focus lens, or any other lens.

The storage 30 is formed, for example, of a hard disk drive or a semiconductor memory. The storage 30 stores a control program P executed by the processor 80 and data processed by the processor 80. In particular, the storage 30 stores source information D1 on use results representing how a first input section 51, a second input section 52, and a third input section 53, which will be described later, have been used in the execution of the operation mode. A specific example of the source information D1 will be described later. The storage 30 may instead be provided in a storage device, a server, or any other component external to the display apparatus 10.

The image processor 40 includes a frame memory 41, develops image information from the I/F 50 in the frame memory 41, carries out a variety of processes, such as a resolution conversion process, a resizing process, and a distortion correction process, as appropriate, and inputs the resultant image information to the display section 20. The image processor 40 carries out as required a process based on a signal from the processor 80, for example, the process of causing the display section 20 to display the image GD, the tool bar GT, and other images.

The I/F 50 includes the first input section 51, the second input section 52, and the third input section 53 as interfaces connectable to an external apparatus, such as the PC 100, and a communication section 54. The I/F 50 may be disposed in an enclosure of the main body of the display apparatus 10 or may be disposed in an enclosure different from the enclosure of the main body of the display apparatus 10.

The first input section 51, the second input section 52, and the third input section 53 can each input image information DS from the PC 100, which is the information terminal apparatus. The first input section 51, the second input section 52, and the third input section 53 in the present embodiment are each connected to the PC 100 in wired connection via the cable 101. Specifically, the first input section 51, the second input section 52, and the third input section 53 are each, for example, a D-sub or HDMI interface. The first input section 51, the second input section 52, and the third input section 53 may comply with the same standard or different standards. The first input section 51, the second input section 52, and the third input section 53 are an example of the "plurality of input sections." Any one of the first input section 51, the second input section 52, and the third input section 53 may be omitted. At least one input section may be provided as well as the first input section 51, the second input section 52, and the third input section 53. At least one of the first input section 51, the second input section 52, and the third input section 53 may be wirelessly connected to the PC 100, for example, via Wi-Fi or Bluetooth or may be connected to the PC 100, for example, via a LAN (local area network) or the Internet. HDMI, Wi-Fi, and Bluetooth are each a registered trademark.

The communication section 54 is so configured that the PC 100 is connectable thereto via the cable 102 and can communicate with the PC 100. Specifically, the communication section 54 is, for example, a USB interface. The number of communication sections 54 may be plural, and in this case, the communication sections 54 may comply with the same communication standard or different communication standards.

The detector 60 detects the position on the screen SC at which the pointing element 90 points and generates position information PS representing the position. The detector 60 includes an imager 61, a light receiver 62, and a position information generator 63. The imager 61 captures an image of the screen SC. The imager 61 is formed of an imaging device, for example, a CCD (charge coupled device) image sensor or a CMOS (complementary MOS) image sensor.

The light receiver 62 receives an infrared signal issued from the infrared light emitter of the pointing element 90. The light receiver 62 is formed of a light receiving device, for example, a photodiode. The detector 60 decodes an output signal from the light receiver 62 and outputs pointing data representing operation performed with the pointing element 90.

The position information generator 63 generates the position information PS on the position on the screen SC at which the pointing element 90 points. Specifically, the position information generator 63 generates the position information PS based on an output signal from the imager 61. The position at which the pointing element 90 points is expressed, for example, in the form of coordinates of a coordinate system set on the screen SC, and the position information PS contains information representing the coordinates.

The operation section 70 includes the operation panel 71 and a remote control light receiver 72. The operation panel 71 is provided on an exterior enclosure of the display apparatus 10 and is configured to be capable of accepting a user's operation. The operation panel 71 outputs a signal based on the user's operation. The remote control light receiver 72 receives an infrared signal from the remote control that is not shown, decodes the infrared signal, and outputs a signal based on the operation performed on the remote control.

The processor 80 has the function of controlling each portion of the display apparatus 10 and the function of processing a variety of types of data. The processor 80 is formed, for example, of a CPU (central processing unit). The processor 80 executes the control program P stored in the storage 30 to achieve a variety of functions including functional portions that will be described later. The processor 80 may be formed of a single processor or a plurality of processors. The entirety or part of the functions of the processor 80 may be achieved by hardware, such as a DSP (digital signal processor), an ASIC (application specific integrated circuit), a PLD (programmable logic device), and an FPGA (field programmable gate array).

The processor 80 includes a controller 81 and a connection detector 82. The controller 81 controls the display section 20, the storage 30, the image processor 40, the I/F 50, the detector 60, and the operation section 70 described above. The connection detector 82 detects connection between the PC 100 and the communication section 54 via the cable 102. The connection detector 82 in the present embodiment detects whether or not the connection is established based on a signal from the I/F 50. The connection is a state in which the PC 100 and the communication section 54 are communicably connected to each other. The I/F 50 may have at least part of the functions of the connection detector 82.

The controller 81 executes the drawing mode, which is an example of the first mode, and the operation mode, which is an example of the second mode in such a way that the two modes are switchable from one to the other. In the drawing mode, the controller 81 causes the display section 20 to display the images G and GD based on the image information DS and the position information PS. On the other hand, in the operation mode, the controller 81 causes the display section 20 to display the image G based on the image information DS and operates the PC 100 based on the position information PS.

The controller 81 selects one of the first input section 51, the second input section 52, and the third input section 53 and causes the display section 20 to display an image based on image information from the input section. The selection in the drawing mode may be automatically made based on a result of detection of an input of image information to any of the input sections or may be made, for example, based on operation performed on the operation section 70. On the other hand, the selection in the operation mode is made based on the source information D1 stored in the storage 30.

FIG. 3 shows an example of the connection between the display apparatus 10 and the PC 100. In the example shown in FIG. 3, one of two PCs 100 is connected to the first input section 51, and the other is connected to the second input section 52. In this case, in the drawing mode, the controller 81 can select one of the first input section 51 and the second input section 52 and causes the display section 20 to display an image based on image information from the input section. When the PC 100 is connected to the communication section 54 via the cable 102 in the state described above, the controller 81 executes the operation mode. That is, the controller 81 executes the operation mode when the connection detector 82 detects the connection. At this point, the controller 81 selects one of the first input section 51, the second input section 52, and the third input section 53 based on the source information D1.

FIG. 4 shows an example of the source information D1. The source information D1 is information on use results representing how the first input section 51, the second input section 52, and the third input section 53 have been used in the execution of the operation mode. For example, the source information D1 is information on the correspondence between the input sections and the modes in which the input sections are used in the last execution of the operation mode, as shown in FIG. 4. In the example shown in FIG. 4, the source information D1 is information representing that the input section used in the last execution of the operation mode is the first input section 51. Therefore, when the source information D1 is, for example, the information in the example shown in FIG. 4, the controller 81 selects the first input section 51 when the connection detector 82 detects the connection. In a case where the operation mode has not been used, the source information D1 contains information representing that the state of the display apparatus 10 is an initial state. In the case where the operation mode has not been used, the source information D1 may, for example, be so set in advance that an arbitrary input section is selected. The source information D1 is not limited to the example shown in FIG. 4 and may, for example, be information on identification of the input section in the last execution of the operation mode.

3. Mode Switching in Display Apparatus

FIG. 5 shows image transition in the switching of the drawing mode and the operation mode from one to the other. The controller 81 causes the display section 20 to display an image G1 shown in the left part of FIG. 5 in the execution of the drawing mode. The image G1 contains the drawing mode switching button GT1, the operation mode switching button GT2, and the drawing tool GT3. In the image G1, the drawing mode switching button GT1 is so displayed as to have an area larger than the area of the operation mode switching button GT2, which indicates that the drawing mode has been selected. Further, although not shown, the image G1 contains an image based on image information from the PC 100 connected to one input section selected by arbitrary operation from the first input section 51, the second input section 52, and the third input section 53.

When the operation mode switching button GT2 is operated during the display of the image G1, and when the connection detector 82 detects the connection, the controller 81 executes the operation mode and causes the display section 20 to display an image G2 shown in the right part of FIG. 5. On the other hand, when the connection detector 82 does not detect the connection, the controller 81 causes the display section 20 to display an image G3 shown in the lower part of FIG. 5.

The image G2 contains the drawing mode switching button GT1 and the operation mode switching button GT2. That is, in this case, the drawing tool GT3 is omitted from the image G1 to form the image G2. In the image G2, the operation mode switching button GT2 is so displayed as to have an area larger than the area of the drawing mode switching button GT1, which indicates that the operation mode has been selected. Although not shown, the image G2 contains an image based on the image information from the PC 100 connected to the same input section as the input section used during the display of the image G1.

When the drawing mode switching button GT1 is operated during the display of the image G2, the controller 81 executes the drawing mode and causes the display section 20 to display the image G1 described above.

The image G3 contains the drawing mode switching button GT1, the operation mode switching button GT2, the drawing tool GT3, and a connection guide image GG. That is, in this case, the connection guide image GG is added to the image G1 to form the image G3. The drawing mode switching button GT1 is so displayed as to have an area larger than the area of the operation mode switching button GT2, which indicates that the drawing mode remains selected.

The connection guide image GG is an image that prompts the user to connect the cable 102 to the communication section 54. In the example shown in FIG. 5, prompting letters "Connect USB cable" are displayed in the connection guide image GG.

The controller 81 keeps the image G3 displayed until a fixed period elapses or until the connection detector 82 detects the connection. In the period for which the image G3 is displayed, the user is notified that the PC 100 and the communication section 54 need to be connected to each other via the cable 102.

When the connection detector 82 does not detect the connection but a fixed period elapses from the start of the display of the image G3, the controller 81 causes the display section 20 to display the image G1 described above while keeping the drawing mode executed. On the other hand, when the connection detector 82 detects the connection during the display of the connection guide image GG, the controller 81 stops displaying of the connection guide image GG, executes the operation mode, and causes the display section 20 to display the image G2 described above.

The image transition in the switching of the drawing mode and the operation mode from one to the other has been described. It is noted that the above-mentioned forms in which the images G1, G2, and G3, the drawing mode switching button GT1, the operation mode switching button GT2, the drawing tool GT3, and the connection guide image GG are displayed have been presented by way of example and are not necessarily employed. For example, the images G1, G2, and G3 may each contain an image other than the images described above. Further, the drawing mode switching button GT1 and the operation mode switching button GT2 may be integrated with each other into a single button. In this case, for example, changing the color of the button in accordance with the selected mode allows the user to recognize the selected mode. Further, for example, the connection guide image GG may contain a sentence different from the letters described above or may be a figure, such as a pictogram.

FIG. 6 is a flowchart showing the procedure of the mode switching performed by the display apparatus 10. First, in step S110, the controller 81 acquires connection information on the connection of the cable 102 from the connection detector 82. Subsequently, in step S120, the controller 81 evaluates based on the connection information whether or not the cable 102 has been connected to the communication section 54.

In a case where the controller 81 determines in step S120 that the connection has been established, the controller 81 evaluates in step S130 whether or not the connection request is being displayed in the connection guide image GG described above. In a case where the controller 81 determines in step S130 that the connection request is being displayed, the controller 81 updates the source information D1 in step S140 by setting the input section being used in the current display operation as the use result in the last execution of the operation mode. Thereafter, in step S150, the controller 81 selects the input section based on the updated source information D1, switches the action mode to the operation mode, and terminates the procedure.

In a case where the controller 81 determines in step S130 that the connection request is not being displayed, the controller 81 acquires in step S160 the source information D1 from the storage 30. The controller 81 then evaluates in step S170 whether or not the state of the source information is the initial state. In a case where the controller 81 determines in step S170 that the state of the source information is the initial state, the controller 81 terminates the procedure. On the other hand, when the controller 81 determines in step S170 that the state of the source information is not the initial state, the controller 81 selects the input section based on the acquired source information, switches the action mode to the operation mode, and terminates the procedure in step S180.

In a case where the controller 81 determines in step S120 that the connection has not been established, the controller 81 acquires the source information D1 from the storage 30. The controller 81 then evaluates in step S200 whether or not the state of the source information is the initial state. In a case where the controller 81 determines in step S200 that the state of the source information is the initial state, the controller 81 terminates the procedure. On the other hand, when the controller 81 determines in step S200 that the state of the source information is not the initial state, the controller 81 acquires the current action mode in step S210. The controller 81 then evaluates in step S220 whether or not the current action mode is the drawing mode. In a case where the controller 81 determines in step S220 that the current action mode is the drawing mode, the controller 81 terminates the procedure. On the other hand, when the controller 81 determines in step S220 that the current action mode is not the drawing mode, the controller 81 selects the input section based on the acquired source information, switches the action mode to the drawing mode, and terminates the procedure in step S230.

The display system 1 described above includes the display apparatus 10 and the pointing element 90, which is used to point a position on the screen SC, as described above. According to the display system 1, the display apparatus 10 or the method for controlling the same provides the following effects.

The display apparatus 10 includes the display section 20, the first input section 51, the second input section 52, and the third input section 53, which are the plurality of input sections, the communication section 54, the connection detector 82, the position information generator 63, the controller 81, and the storage 30, as described above. The controller 81 executes the drawing mode, which is an example of the first mode, and the operation mode, which is an example of the second mode, in such a way that the two modes are switchable from one to the other. The storage 30 stores the source information D1 on the use results representing how the first input section 51, the second input section 52, and the third input section 53 have been used in the execution of the operation mode. In the case where the connection detector 82 detects the connection, the controller 81 selects one of the first input section 51, the second input section 52, and the third input section 53 based on the source information D1 and executes the operation mode.

As described above, when the connection detector 82 detects the connection, the controller 81 executes the operation mode. Therefore, when the PC 100 is connected to the communication section 54 via the cable 102, the action mode is automatically switched to the operation mode even in the state in which the drawing mode or any other action mode is being executed. The display apparatus 10 therefore provides higher convenience than when the action mode is manually switched to the second mode. In the case where the connection detector 82 detects the connection, the controller 81 selects one of the first input section 51, the second input section 52, and the third input section 53 based on the source information D1. The input section used in the operation mode can therefore be automatically selected. The display apparatus 10 therefore provides higher convenience than when an input section is manually selected. Further, since the source information D1 used to select an input section is stored in the storage 30, the user needs to make no in-advance setting, whereby the display apparatus 10 provides higher convenience than when the user needs to make an in-advance setting.

In the present embodiment, when the connection detector 82 detects the connection, the controller 81 selects the input section used last time based on the source information D1 from the first input section 51, the second input section 52, and the third input section 53 and executes the operation mode. For example, when the user who has used the display system 1 last time uses the operation mode again, the user is likely to use the same input section as that used last time. Therefore, when the user uses the same input section as that used last time to use the operation mode, an appropriate input section can be selected.

Further, the controller 81 causes the display section 20 to display the operation mode switching button GT2, which is an operation image capable of accepting operation of switching the drawing mode to the operation mode. In the case where the connection detector 82 does not detect the connection but operation performed on the operation mode switching button GT2 is accepted, the controller 81 causes the display section 20 to display the connection guide image GG, which is an image that prompts the user to connect the cable 102 to the communication section 54. The displayed connection guide image GG can notify the user that the PC 100 and the communication section 54 need to be connected to each other via the cable 102. As a result, the user establishes the connection as required, and the operation mode is executed.

In the case where the controller 81 switches the drawing mode to the operation mode when the controller 81 accepts operation performed on the operation mode switching button GT2, the controller 81 updates the source information D1. The updates allows selection of an input section used to perform display operation when the operation is accepted. An appropriate input section according to the user's operation can therefore be selected.

In the case where the connection detector 82 does not detect the connection, the controller 81 executes the drawing mode. Therefore, when the user does not connect the cable 102 to the communication section 54, the drawing mode can be executed without forcing the user to perform other operation.

4. Variations

The display apparatus and the display system according the embodiment of the present disclosure have been described above with reference to the drawings, but the present disclosure is not limited thereto. The configuration of each portion in the embodiment of the present disclosure can be replaced with an arbitrary configuration having the same function as that in the embodiment described above. Further, an arbitrary configuration can be added to the configurations in the embodiment described above. Moreover, in the present disclosure, arbitrary configurations in the embodiment described above may be combined with each other.

In the embodiment described above, the configuration in which the input section used in the operation mode is selected based on a use result representing the input section used last time has been presented by way of example, but not necessarily. Instead, the input section used in the operation mode may be selected based on a use result other than the use result representing the input section used last time. For example, the frequency of use in a predetermined period on an input section basis may be stored as input section use results in the storage 30, and the most frequently used input section may be selected. In the case where the connection detector 82 detects the connection, the controller 81 may select the most frequently used input section based on the source information D1 and execute the operation mode, as described above. For example, when a user under a fixed situation uses the operation mode, the user is likely to use the most frequently used input section. Therefore, when the user uses the most frequently used input section to use the second mode, an appropriate input section can be selected. Further, even when the use result representing the input section used last time results from connection that is not intended by the user, an appropriate input section can be selected.

Further, in the embodiment described above, the configuration in which the storage 30 and the controller 81 are each implemented in the display apparatus 10 has been presented by way of example, but not necessarily, and at least one of the storage 30 and the controller 81 may be implemented in an apparatus installed externally to the display apparatus 10, for example, the PC 100.

What is claimed is:

1. A display apparatus comprising:
   a display section that displays an image on a display surface;
   a plurality of input sections to which image information is inputtable from an information terminal apparatus;
   a communication section so configured that the information terminal apparatus is connectable thereto via a cable and capable of communicating with the information terminal apparatus;
   a connection detector that detects connection between the information terminal apparatus and the communication section via the cable;
   a position information generator that generates position information on a position on the display surface at which a pointing element points;
   a controller that executes a first mode that causes the display section to display an image based on the image information and the position information and a second mode that causes the display section to display an image based on the image information and operates the information terminal apparatus based on the position information in such a way that the two modes are switchable from one to the other; and
   a storage that stores source information on a use result representing the input section used in execution of the second mode,
   wherein when the connection detector detects the connection, the controller selects the input section used last time based on the source information and executes the second mode.

2. The display apparatus according to claim 1, wherein when the controller causes the display section to display an operation image capable of accepting operation of switching the first mode to the second mode, and the connection detector does not detect the connection, but operation performed on the operation image is accepted, the controller causes the display section to display an image that prompts connection of the cable to the communication section.

3. The display apparatus according to claim 2, wherein when the cable is connected to the communication section and the controller switches the first mode to the second mode in response to the acceptance of the operation, the controller updates the source information.

4. The display apparatus according to claim 1, wherein when the connection detector does not detect the connection, the controller executes the first mode.

5. A display system comprising:
   the display apparatus according to claim 1; and
   a pointing element used to point at a position on the display surface.

6. A display apparatus comprising:
   a display section that displays an image on a display surface;
   a plurality of input sections to which image information is inputtable from an information terminal apparatus;
   a communication section so configured that the information terminal apparatus is connectable thereto via a cable and capable of communicating with the information terminal apparatus;
   a connection detector that detects connection between the information terminal apparatus and the communication section via the cable;
   a position information generator that generates position information on a position on the display surface at which a pointing element points;
   a controller that executes a first mode that causes the display section to display an image based on the image information and the position information and a second mode that causes the display section to display an image based on the image information and operates the information terminal apparatus based on the position information in such a way that the two modes are switchable from one to the other; and
   a storage that stores source information on a use result representing the input section used in execution of the second mode,
   wherein when the connection detector detects the connection, the controller selects the input section most frequently used based on the source information and executes the second mode.

7. A method for controlling a display apparatus including a display section that displays an image on a display surface, a plurality of input sections to which image information is inputtable from an information terminal apparatus, a communication section so configured that the information terminal apparatus is connectable thereto via a cable and capable of communicating with the information terminal apparatus, and a position information generator that generates position information on a position on the display surface at which a pointing element points, the method comprising:
   detecting connection between the information terminal apparatus and the communication section;
   executing a first mode that causes the display section to display an image based on the image information and the position information and a second mode that causes the display section to display an image based on the image information and operates the information terminal apparatus based on the position information in such a way that the two modes are switchable from one to the other;
   storing source information on a use result representing the input section used in execution of the second mode; and
   selecting the input section used last time based on the source information and executing the second mode when the connection between the information terminal apparatus and the communication section is detected.

8. The method for controlling a display apparatus according to claim 7, wherein when the connection between the information terminal apparatus and the communication section is detected, the input section most frequently used is selected based on the source information, and the second mode is executed.

9. The method for controlling a display apparatus according to claim 7, wherein when the display section is caused to display an operation image capable of accepting operation of switching the first mode to the second mode, and the connection between the information terminal apparatus and the communication section is not detected, but operation performed on the operation image is accepted, the display section is caused to display an image that prompts connection of the cable to the communication section.

10. The method for controlling a display apparatus according to claim 9, wherein when the cable is connected to the communication section and the first mode is switched to the second mode in response to the acceptance of the operation, the source information is updated.

\* \* \* \* \*